UNITED STATES PATENT OFFICE.

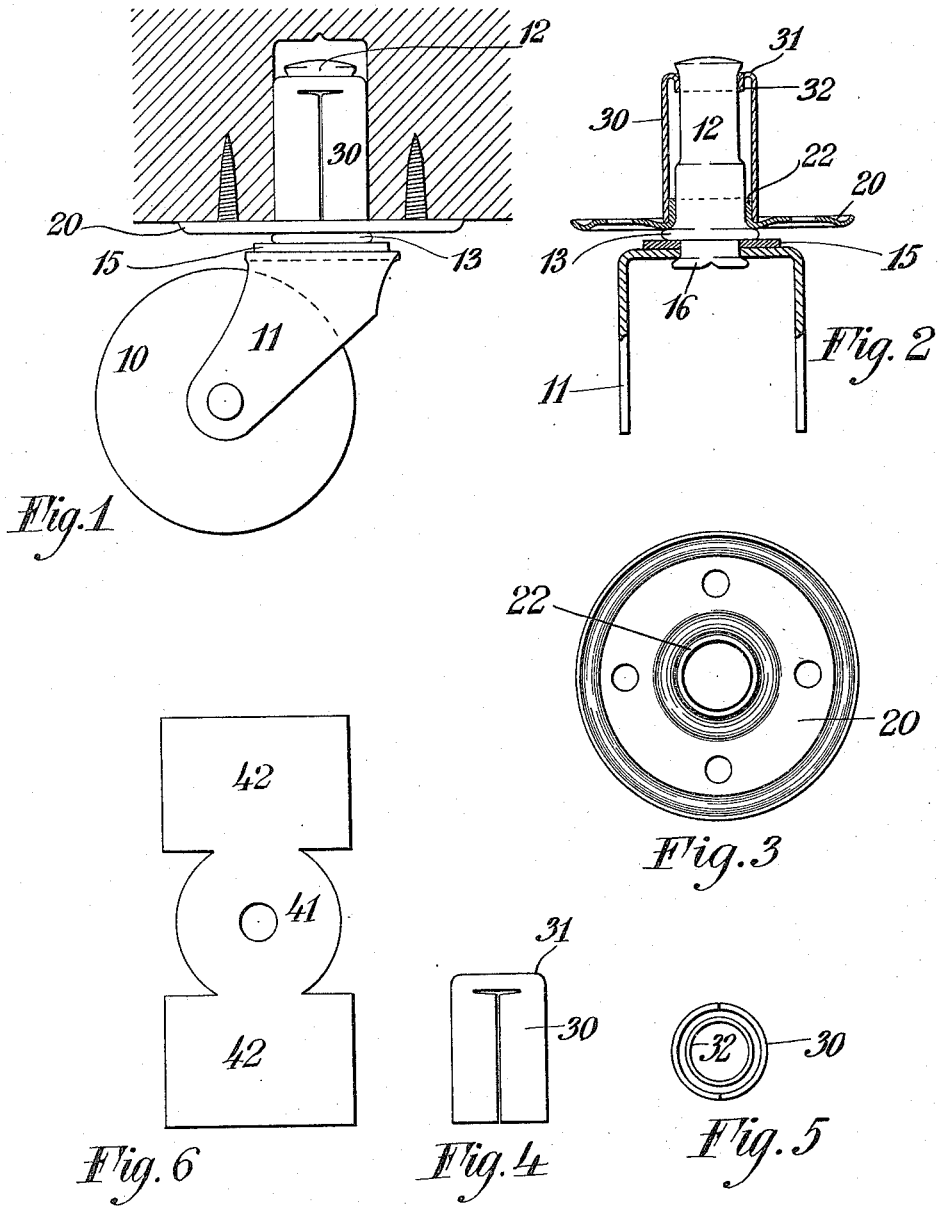

ALBERT B. DISS, OF NEWARK, NEW JERSEY, ASSIGNOR TO UNIVERSAL CASTER & FOUNDRY COMPANY, OF NEW YORK, N. Y., A CORPORATION OF NEW JERSEY.

CASTER FOR PIANOS AND OTHER USES.

1,160,583.  Specification of Letters Patent.  Patented Nov. 16, 1915.

Application filed May 13, 1914. Serial No. 838,334.

*To all whom it may concern:*

Be it known that I, ALBERT B. DISS, of Newark, New Jersey, a citizen of the United States of America, manufacturer, have invented certain new and useful Improvements in Casters for Pianos and other Uses, of which the following is a specification, accompanied by drawings.

The principal object of the invention is to produce an improved construction of caster of the type suitable more particularly for pianos and heavy furniture having the caster pintle rotatable in a suitable sleeve or bearings, which construction shall combine economy of manufacture with great strength and thorough reliability and durability in use.

The present improvement, in its most complete and preferred form, which is described in the present specification, provides a caster having these characteristics and of very simple construction. It has a carrying plate that is screwed to the base of the piano or other furniture, surrounds the pintle, and forms a journal bearing for the lower end of the pintle supported upon the jaws and pintle of the caster, preferably without interposed ball bearings. The carrying plate has an upturned flange which extends inside of and loosely supports the pintle sleeve. The pintle sleeve is a hollow cylinder with its upper end inturned and downturned to form a smooth unbroken upper bearing for the pintle, which is upset and enlarged to form a head for preventing the pintle dropping out of the sleeve. The sleeve is formed from a blank of strong sheet metal and the inturned upper end of the sleeve is a continuous unbroken collar around the pintle, from which extend two downwardly-bent semi-cylindrical sleeve members. The sleeve is secured or confined loosely between the head of the pintle and the carrying plate, and when it is inserted in the hole bored in the furniture to fit it and the carrying plate secured by screws to the base of the furniture, the carrying plate, sleeve, pintle and other parts of the caster are secured to the furniture so that the caster will operate properly without requiring any rigid or tight connection between the sleeve and the carrying plate. This construction, therefore, permits a slight angular adjustment of the sleeve in respect to the carrying plate without strain if the hole bored in the furniture is not an accurate fit or in exactly right relation to the carrying plate.

In the drawings, Figure 1 is a side view of a caster embodying the improvements in the best form known to me, secured in place beneath a body of wood, which may be the base of a piano or other article to be supported, and which is shown in section; Fig. 2 is an elevational view of parts of the same, and partly in central vertical section; Fig. 3 is a top view of the carrying plate; Figs. 4 and 5 are side view and bottom view of the sleeve; and Fig. 6 is a view showing the blank of sheet metal from which the sleeve is made.

In the drawings, 10 is the caster wheel, 11 the caster jaws or horn of any suitable construction, and 12 the pintle. The pintle is preferably larger where it bears within the carrying plate 20 than at its upper portion where it bears within the sleeve 30, and the upper end is upset or headed to form an enlargement of sufficient size to prevent its dropping out of the sleeve 30 when the furniture and caster are raised. Toward the lower end, the pintle has an enlargement 13, providing an upper shoulder for supporting the carrying plate 20, preferably without interposed ball bearings, which are considered objectionable for pianos. The lower side of the enlargement 13 forms a shoulder for securing the jaws or horn of the caster, preferably with an interposed strengthening plate 15, as shown. The lower end of the pintle extends through the jaws and is upset and thereby riveted tightly to the jaws, as shown at 16.

The construction of the caster wheel, jaws and pintle shown and described is only one of a variety of forms of these parts which may be employed with the sleeve and carrying plate shown.

The carrying plate 20 is preferably circular and of sheet metal, and preferably corrugated to form an annular channel or groove near its periphery to strengthen it and give to its exposed exterior a neat rounded shape, as is very usual in carrying plates of this type of caster. It is also provided with four screw holes, by means of which it can be screwed to the furniture, as illustrated in Fig. 1. Centrally, the carrying plate has an opening fitting around the pintle and an upturned flange 22, which is adapted internally to form a smooth journal bearing for the pintle and externally to fit within the sleeve 30. At the base of this flange 22, the carrying plate is annularly corrugated, forming a channel or groove on the upper face, which approximately fits and receives the lower end of the sleeve 30, as seen in Fig. 2, this corrugation also strengthening the plate and giving a rounded under surface which is well adapted for supporting the plate upon the correspondingly-shaped shoulder of the pintle, as in Fig. 2.

The sleeve 30 provides a very strong and, at the same time, very simple and inexpensive form of bearing for the upper end of the pintle, and a means of preventing the pintle dropping downward, a sleeve for fitting the hole bored in the wood and for resting upon the carrying plate 20. It can be formed from a sheet-metal blank shown in Fig. 6, which has a perforated central portion 41, which becomes the bearing collar 31 when in its final shape, and the two side members 42, which become in their final shape the two side members or halves of the sleeve 30. The annular part 41 is pressed in suitable dies to form a collar of inverted U-section, from which extend downward in continuity with the outer leg of the U the two sleeve members formed from side portions 42 of the blank, which are bent and pressed to half-cylinders. These two halves or sides of the finished sleeve 30 meet each other and the continuous collar at the top, along T-shaped lines of meeting, as seen in Fig. 1. It will be seen that the finished sleeve has its upper end inturned and downturned parallel with the pintle to form a bearing flange 32 around the pintle and a continuous collar in the form of an inverted channel or U, giving great strength to the bearing for the upper end of the pintle and providing, by the width of the U, for ample space above it for the enlarged head of the pintle within the hole bored to fit the sleeve.

In assembling the carrying plate, sleeve and pintle, it is only necessary to pass the pintle through the carrying plate and through the sleeve and then upset the head of the pintle, without in any other wise securing the sleeve to the carrying plate.

It will be seen that in applying the caster to furniture, the hole can be bored of the appropriate size and the caster then put in place, pushing or driving the pintle and sleeve into the hole and then fixing the carrying plate by its screws. The pintle at its upper end will be accurately supported in the journal bearing or collar 31 at the upper end of the sleeve. At the lower end of the sleeve, the flange 22 of the carrying plate lying within the sleeve will relatively center the sleeve and carrying plate when the screws which secure the carrying plate are screwed in, and the pintle will then turn freely within the two bearings formed by the collar of the sleeve and by the flange of the carrying plate respectively and be held substantially rigidly upright, but freely rotatable. If there are slight errors in boring the hole, it will be seen that the carrying plate and sleeve 30 can adjust themselves slightly to each other, without materially disturbing the proper operation of the caster, and that the construction combines extreme simplicity of structure and economy of manufacture with very great strength and reliability in use.

I claim the following:

1. A caster combining, with a caster wheel, jaws and a rotary pintle, a sleeve forming a journal bearing for the upper part of the pintle, and a carrying plate extending beneath the lower end of the sleeve and which surrounds the pintle and has a flange upturned and within the lower end of the sleeve.

2. A caster combining, with a caster wheel, jaws and a rotary pintle, a sleeve forming a journal bearing for the upper part of the pintle, and a carrying plate extending beneath the lower end of the sleeve and which surrounds the pintle and has a flange upturned and within the lower end of the sleeve, the said pintle being enlarged above the upper journal bearing, thereby confining the sleeve by and between the enlargement and the carrying plate and preventing the pintle dropping out.

3. A caster combining, with a caster wheel, jaws and a rotary pintle, a sleeve of sheet metal that has a continuous unbroken annular collar forming a bearing around the upper part of the pintle and has a plurality of sleeve members extending downward therefrom, and a carrying plate extending beneath the lower end of the sleeve but loose therefrom, the said pintle having enlargements above the collar and below the carrying plate.

4. A caster combining, with a caster wheel, jaws and a rotary pintle, a carrying plate and a sleeve having its upper end inturned and downturned, forming a continuous unbroken annular journal bearing of rounded section for the pintle, the pintle being enlarged above such bearing to retain the pintle.

5. A caster combining, with a caster wheel, jaws and a rotary pintle, a carrying plate surrounding the pintle and a sleeve for the pintle which is confined between an enlargement of the upper end of the pintle and the carrying plate while free to move in respect to both, the carrying plate having an annular groove which receives the lower end of the sleeve, and means for directly securing the carrying plate to the article to be carried.

In testimony whereof I have signed this specification in the presence of two subscribing witnesses this 12th day of May, 1914.

ALBERT B. DISS.

Witnesses:
HAROLD BINNEY,
A. PSCHIERER.